United States Patent [19]
Watts

[11] 3,981,330
[45] Sept. 21, 1976

[54] WATER MIXING TAP
[75] Inventor: Horace Watts, Pinner, England
[73] Assignee: H. & D. E. Watts Limited, Middlesex, England
[22] Filed: Aug. 5, 1974
[21] Appl. No.: 495,039

[52] U.S. Cl............................. 137/636.4; 251/175; 251/182
[51] Int. Cl.²......................................... F16K 11/00
[58] Field of Search....... 137/625.17, 636.4, 614.11, 137/636, 636.2, 636.3; 251/182, 175

[56] References Cited
UNITED STATES PATENTS

| | | | |
|---|---|---|---|
| 1,489,709 | 4/1924 | O'Flaherty et al. | 137/614.11 X |
| 2,079,743 | 5/1937 | Krieger | 137/614.11 X |
| 2,589,857 | 3/1952 | Pena | 137/636.3 |
| 2,644,483 | 7/1953 | Parker | 137/614.11 X |
| 3,342,214 | 9/1967 | Panerai et al. | 137/636.4 |
| 3,568,719 | 3/1971 | Bonomi | 137/636.4 |
| 3,770,017 | 11/1973 | Enterante | 137/625.17 |

*Primary Examiner*—William R. Cline
*Attorney, Agent, or Firm*—Cushman, Darby & Cushman

[57] ABSTRACT

A fluid mixing valve comprises a body defining a cylindrical chamber having two spaced-apart inlets and an outlet spaced axially from the inlets, a valve closure element and a mixture control element in the chamber and a valve spindle connected to the closure and control elements. Axial movement of the spindle moves the closure element in a mode to open or close the inlets. Rotation of the actuator, when the inlets are open, rotates the mixture control element so as to control the relative degree of flow through the inlets.

16 Claims, 11 Drawing Figures

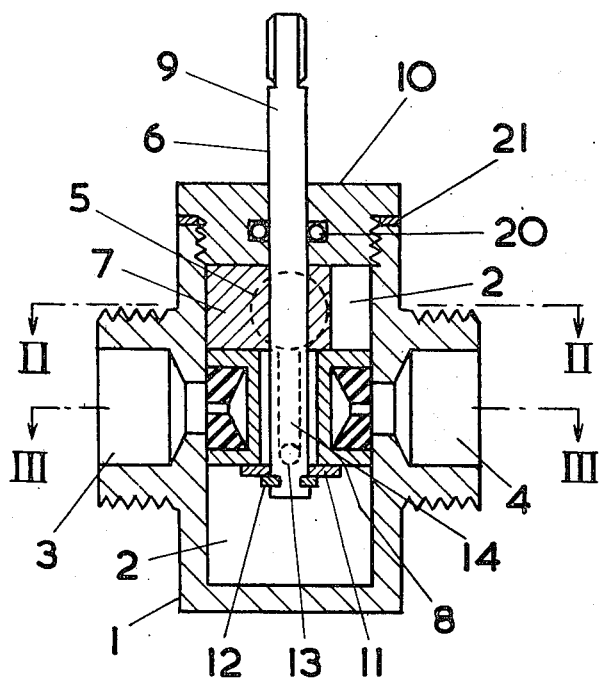
FIG. 1
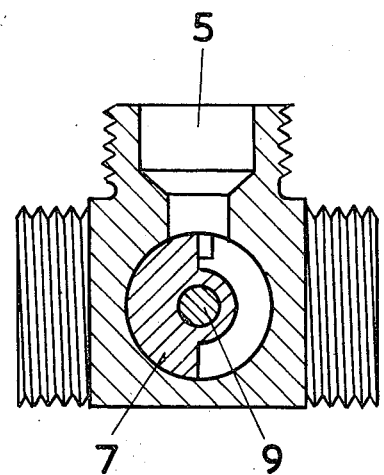
FIG. 2
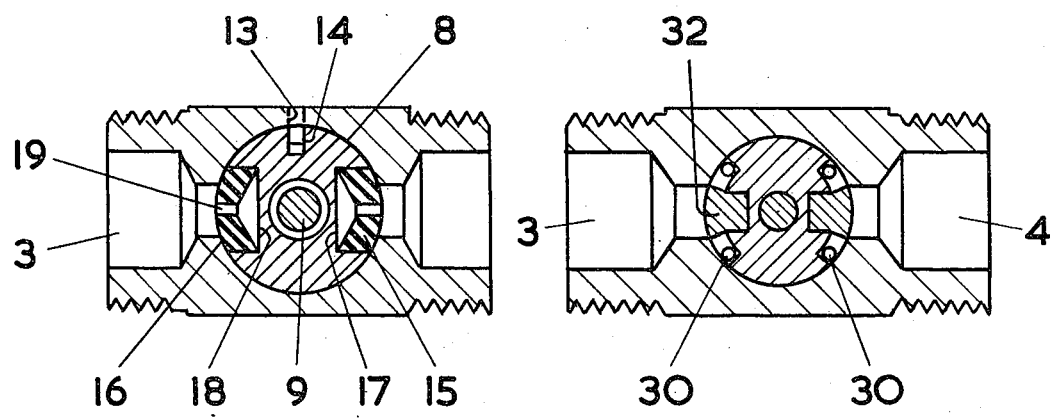
FIG. 3
FIG. 5

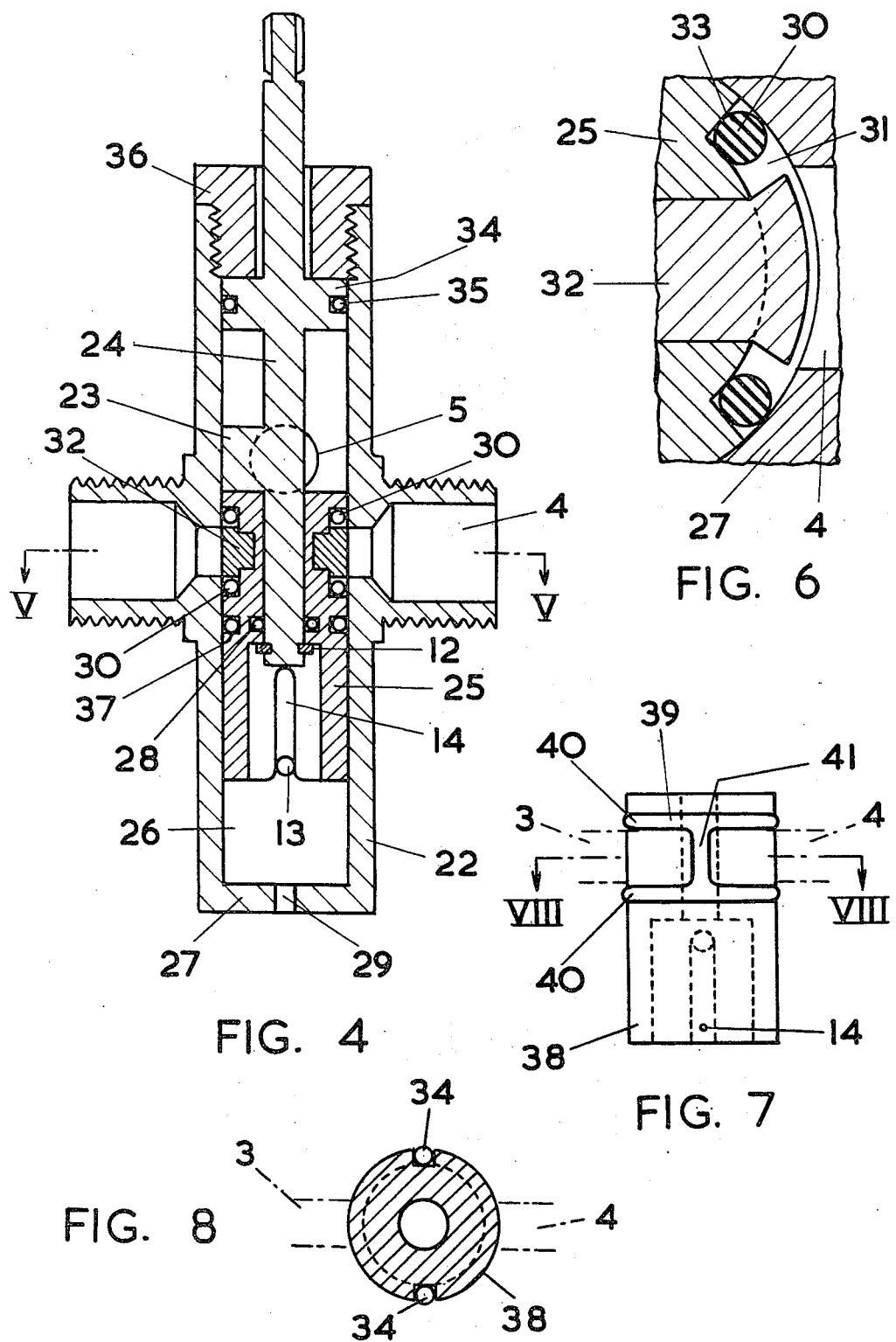

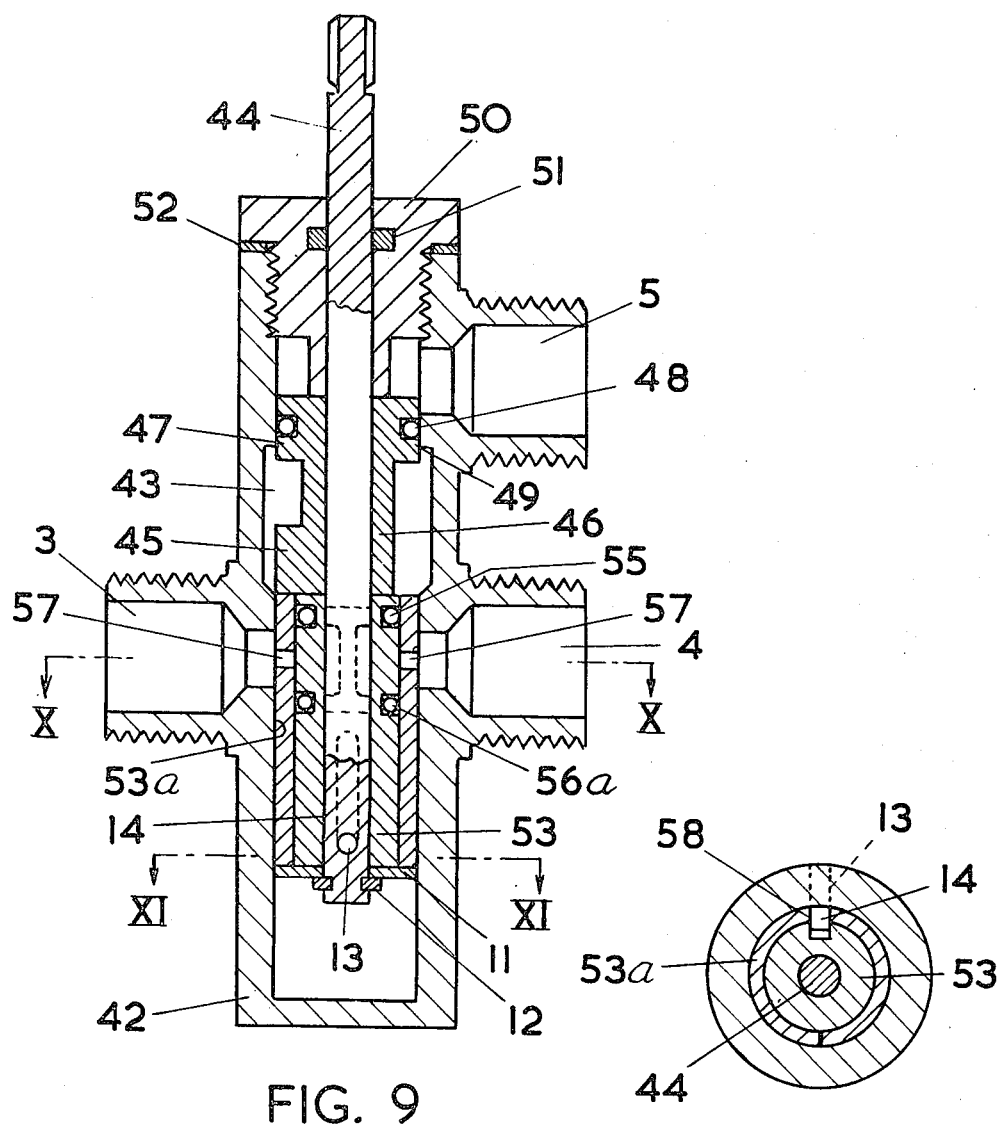
FIG. 9
FIG. 11
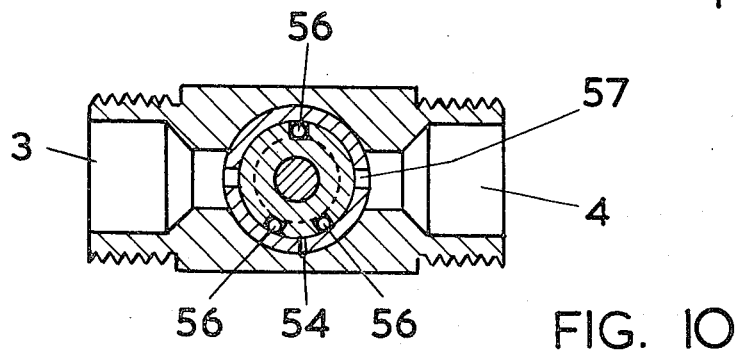
FIG. 10

WATER MIXING TAP

FIELD OF THE INVENTION

The invention relates to a fluid mixing valve and in particular to a mixing valve for hot and cold water supplies.

SUMMARY OF THE INVENTION

According to the present invention, a fluid mixing valve comprises a body having a surface defining a cylindrical chamber within the body, a plurality of inlets for different supplies of fluid to the chamber and at least one outlet for fluid from the chamber; a valve means disposed within the chamber, the valve means comprising a valve closure element and a mixture control element disposed coaxially of one another relative to an axis of generation of the chamber, the elements being movable together axially of the chamber into and out of a valve closed position in which the valve closure element closes the inlets to the chamber, the mixture control element also being rotatably movable in the chamber to vary the relative degree of opening of the inlets when the inlets lie out of the valve closed position, the axial and rotative movement of the elements controlling the selection, mixture and volume of the fluid supplies; and a single valve actuating means operably connected to the valve means to control axial and rotative movement of the elements of the valve means.

BRIEF DESCRIPTION OF THE DRAWINGS

Embodiments of the invention will now be described, by way of example, with reference to the accompanying drawings, in which:

FIG. 1 is a sectional elevational view through a mixing valve forming a first embodiment;

FIGS. 2 and 3 are cross-sectional views of the mixing valve taken, respectively, along lines II—II and III—III in FIG. 1;

FIG. 4 is a view similar of a second embodiment;

FIG. 5 is a cross-sectional view of the valve of the second embodiment taken along line V—V in FIG. 4;

FIG. 6 is a view also taken along line V—V of part of the valve of FIG. 4 and on an enlarged scale;

FIG. 7 is a side elevational view of part of a third embodiment;

FIG. 8 is a cross-sectional view taken along line VIII—VIII of FIG. 7;

FIG. 9 is a sectional elevational view through a fourth embodiment;

FIGS. 10 and 11 are cross-sectional views taken, respectively, along lines X—X and XI—XI in FIG. 9.

DESCRIPTION OF THE PREFERRED EMBODIMENTS

In a first embodiment shown in FIGS. 1 to 3, a fluid mixing valve comprises a body 1 having a cylindrical chamber 2 and inlet ports 3 and 4 to the chamber, respectively, for supplies of hot and cold water. It also has an outlet port 5 for the discharge of cold, hot or mixed water. As can be seen from the Figures, the inlet ports are diametrically aligned with one another and the outlet port is axially spaced from them along the chamber.

Valve means 6 is disposed within the chamber 2. The valve means comprises a mixture control element 7 and a valve closure element 8 which is disposed coaxially of the chamber in relation to the element 7. A single valve actuating means is provided and this comprises a spindle 9 which passes coaxially through elements 7 and 8 and through a cover cap 10 which seals the upper end of chamber 2. The top of the spindle is for attachment to a control handle (not shown). The mixture control element 7 is secured to the spindle 9 by press fitting or cementing or other means so that it always stays in fixed relation to the spindle. The spindle, however, is rotatable within the valve closure element 8 and the element 8 is secured to the spindle by means of a washer 11 engaging the lower end of the element and a circlip 12 which holds the washer in place against the element 7.

The spindle 9 is rotatable within the chamber and is also movable axially and hence the mixture control element is also movable in these two directions by the spindle. Axial movement of the spindle also causes axial movement of the valve closure element 8. However, the valve closure element 8 is prevented from rotation by the provision of a pin 13 extending into the chamber and secured to the body 1, the pin engaging within a slot 14 formed axially along the peripheral surface of the element 8. Thus when the spindle 9 rotates, the element 8 remains stationary.

The valve closure element 8 is provided with two resilient seals 15 and 16 which close the inlets when the valve closure element is in its upper position as shown in FIG. 1. The seals are tubular and are received within two cylindrical recesses 17 and 18 formed in the element 8 and lie in sliding and sealing engagement with the cylindrical surface of the body forming the chamber 2. Each seal is a sliding and sealing fit in its associated recess and has an aperture 19 passing through it so that when in register with the associated inlet 3 or 4, water pressure acts through the aperture on the inner end of the seal further to urge the outer end against the part of the cylindrical surface immediately surrounding the inlet. This hydraulic unbalance is achieved by making the seal a press fit against the cylindrical surface of the chamber whereby water pressure is excluded from the outer end of the seal while having access to its inner end. Each seal is in slight compression lengthwise so that resilience of the material of the seal always keeps the outer end against the cylindrical surface of the chamber. Alternatively, spring means may be fitted in each recess 17, 18 to urge the seals against the cylindrical surface of the chamber 2.

The mixture control element 7 is basically a segment of a cylinder and when moved downwards from the chamber 2, progressively into line with the inlets 3 and 4, may be rotated to provide any degree of relative opening of the two inlets so as to control the temperature of the discharge. Conversely, adjusting the axial position of the valve means varies the volume of discharge without affecting its temperature as the seals 15 and 16 may overlap the inlets in required amount of locating the valve means in any intermediate position between its upper and lower limits. The valve may be closed completely in any angular position of the mixing control element by moving the spindle axially to the extreme upper position shown in FIG. 1 of the drawings in which the valve means lie in a valve closed position and the seals 15 and 16 close the inlets 3 and 4.

It will be observed that the valve means is hydraulically unbalanced when in an open position because opposed surfaces thereof, subject to water pressure within the chamber, are different in area and there is, therefore, a net force produced which tends to move the valve means in an upwards direction. The pressure existing in chamber 2 will vary from atmospheric pressure when the valve is closed to a maximum as the valve is progressively opened and this pressure is the equivalent of the pressure drop between the chamber and the outlet 5. In taps or valves for water services this pressure is comparatively small and provided the difference between the two opposed transverse areas is kept sufficiently small, the net axial force tending to shift the valve means axially is not sufficient to overcome the force created by friction between the seals 15 and 16 and the surface of chamber 2. This frictional grip is also assisted by an O-ring 20 located within the cover cap 10 and sealing against the spindle 9. The seal ring 21 also seals the cover cap with respect to the body 1.

Effectively the difference between the opposed transverse areas close the cross-sectional area of the spindle 9 and by keeping the diameter of diameter of spindle 9 as small as possible (typically of the order of 6 millimeters) such an arrangement is entirely feasible and has the advantage of being less complicated and less expensive than a balanced arrangement.

In further embodiments now to be described, the same reference numerals will be used for parts of the same construction as in the first embodiment.

In a second embodiment, as shown in FIGS. 4 to 6, a valve means within a fluid mixing valve 22 comprises a mixture control element 23 which is integrally formed with a spindle 24 so that they form one unit. Together with the mixture control element 25 the element 23 and spindle are mounted within a cylindrical chamber 26 of a valve body 27. As in the first embodiment, the valve closure element 25 is axially movable within the chamber but non-rotatably held in position by the pin 13 received in slot 14. An O-ring 28 is provided between the spindle 24 and the element 25 to prevent water leaking into the bottom of chamber 26. A vent hole 29 is provided in the bottom end wall of the body 27 to vent the inside of the valve means to atmosphere. As in the first embodiment, a circlip 12 is provided on the lower end of the spindle 24 to hold the element 25 upon the spindle and in fixed relation to the mixture control element 23.

The valve closure element 25 is provided with two resilient seals for sealing the inlets into the chamber. These seals are in the form of two O-rings 30 located in annular recesses 31 formed between the sides of bores in the element 25 and a plug 32 inserted into the bore. This can be clearly seen from FIG. 6. The main axes of the O-rings and the recesses lie normal to the axis of the chamber 26 and each O-ring is compressed between the bottom of its associated recess and the surface of the body forming the chamber 2. It is also an interference fit with the side wall 33 of the associated recess provided by the element 25. The plugs 32 centre the O-rings and prevent them from collapsing inwardly as the valve closure element is reciprocated. In operation, when the O-rings 30 are in register with the surface area of the body immediately surrounding the inlet ports 3 and 4, water pressure acts on the internal projected area of the rings to urge them further against the surface 33 and bottom of the recess 31, and also against the cylindrical surface 26. The valve closed position in which this situation arises is shown in FIGS. 4, 5 and 6. The unit of valve, mixture element 25 and the spindle also includes a radially extending flange 34 spaced axially from and above the element 23. The flange 34 has an O-ring seal 35 located in a recess in its outer periphery and this seal engages with the cylindrical surface of the body forming the chamber 2. As can be seen from FIG. 4, the O-ring 35 is disposed above the outlet 5 and during movement of the valve means downwards from its valve closed position shown in FIG. 4, the seal 35 moves towards the outlet but never crosses it so that the part of the chamber located above the seal is always sealed from the flow of water. In its upper position, the flange 34 engages a cover cap 36 which is merely screwed into the top of the body and no seals are required between the cap 36, body and spindle.

The valve mixture element 23 is of a shape similar to that of the element 7 in the first embodiment. With the valve means located in the valve closed position, as shown in FIG. 4, the valve closure element 25 has an O-ring 37 disposed around it beneath the seals 30 and the O-ring 37, together with the O-ring 35 hydraulically balance the valve means in all positions.

The method of operation of the construction described in the second embodiment is similar to that of the first embodiment in that movement axially of the valve means down from the position shown in FIG. 4 enables the seals 30 of the valve closure element 35 to vary the degree of opening of the inlets into the chamber. Rotation of the spindle 24 and thus of the mixture control element 23 alters the degree of flow of fluid from the two inlets so as to vary the mixture.

In a third embodiment shown in FIGS. 7 and 8, a fluid mixing valve which is otherwise similar to that described in the second embodiment, has a valve closure element 38 which is different from the valve closure element 25 of the second embodiment. The valve closure element 38 differs from that of the second embodiment in that it has a single resilient seal 39 which engages the surface of the body defining the chamber. In this case the seal 39 is composed of two annular seal portions 40 received in annular recesses formed around and axially spaced apart along the valve closure member and two diametrically opposed axially extending seal portions 41 which are received in axially extending recesses and extend between the annular seal portions. In a valve closed position, the valve closure member 38 lies with the annular seal portions 40 with the inlets 3 and 4 between them. The position of the inlets are shown in FIG. 7 by chain-dotted lines on each side of the valve closure member. Also in the valve closed position, the axially extending seal portions 41 lie between the inlets. The effect of the positioning of the seal portions in this way is, therefore, that the inlets are sealed from one another and also from the outlet.

In a fourth embodiment as shown in FIGS. 9 to 11, the valve body 42 defines within it a valve chamber 43. In this construction, the valve means comprises a spindle 44 having secured to it a mixture control element 45 in the manner described in the first embodiment. The element 45 is of similar shape to the elements in the previous embodiments but is integrally formed with an upwardly extending cylindrical part 46 which merges at its top end into a radially extending flange 47 housing an O-ring 48 in a recess in its outer periphery. As shown in FIG. 9, with the valve means in the closed position, the seal 48 lies between the inlets 3 and 4 and the outlet 5. In this position the seal 48 engages a sealing surface 49 formed by the body at the top of the chamber so as to prevent water from flowing from the chamber through the outlet with the valve in its closed position. Upon movement of the valve means axially downwards, the seal 48 moves away from the sealing surface 49 so as to allow water to pass from the chamber and out through the outlet. A cover cap 50 at the top of the body 1 has seals 51 and 52 sealing, respectively, with the spindle and the body so as to prevent leakage of water when the valve is in an open position.

A valve closure element 53 is received upon the spindle 44 in a rotatable manner as in the first embodiment, and is held in position by a pin 13, also as in the first embodiment, so that rotation of the spindle rotatably to move the mixture control element 45 does not impart the rotational movement to the valve control element. The valve closure element 53 carries a surrounding sleeve 53a of low friction plastics material, the sleeve 53a being split longitudinally as shown at position 54 in FIG. 10. The sleeve 53a is biased outwardly by opening of the split and away from the valve closure element and into intimate sliding and sealing engagement with the surface of the chamber 43 by a resilient seal 55. The seal 55 is of the same construction as the seal 39 described in the third embodiment, except that it has three axially extending seal portions 56, two of which lie one on each side of the longitudinal split 54. The sleeve 53a is provided with two apertures 57 which, when the valve means lies in the valve closed position, lie in alignment with the inlets 3 and 4 as shown in FIG. 9, whereby water pressure acts through the apertures and against the interior of the sleeve so as to assist the seal 55 in urging the sleeve against the cylindrical surface of the body. The areas upon which the water acts in the sleeve are separated from one another by the axially extending seal portions 56 and also annular seal portions 56a of the seal 55. In this way, with the valve means in a closed position, the sleeve is fluid-tightly urged against the areas of the cylindrical surface immediately surrounding the ports 3 and 4 so as to prevent water from flowing out of the ports and into the chamber.

In addition to the pin 13 passing into slot 14 to prevent the rotation of the element 52, it also passes through a slot 58 formed in the sleeve so that the sleeve and element 52 are non-rotatably held together.

The valve of the fourth embodiment operates in a similar manner to that described above for the other embodiments in that movement axially downwards causes the valve closure element to uncover the ports 3 and 4 in amounts dependent upon the axial position of the valve means so as to control the rate of water supply possible from the inlets and the mixture control element 45 varies the mixture by its rotational position.

Alternatives to the embodiments are possible, for example, the mixture control element could be split axially and have two halves spring fitted against the surface of the chamber. Alternatively, the sleeve 53 of the fourth embodiment could be made of metal and sprung outwardly within the chamber so as to sealingly engage the cylindrical surface. In this case, the sealing members 48 and 55 could be dispensed with.

I claim:
1. A fluid mixing valve comprising a body defining a chamber having a surface of which at least a portion is cylindrical, said cylindrical surface having a first fluid inlet therein and a second fluid inlet therein at a position spaced from said first fluid inlet, a fluid outlet leading from said chamber, valve means positioned operatively within said chamber and comprising a valve closure element and a mixture control element, a valve actuator operatively connected to said elements, said elements being supported for joint axial movement in said chamber under the control of the valve actuator, the mixture control element being supported for rotational movement relative to both the chamber and the valve closure element under the control of the valve actuator, obturating means carried by the valve closure element and engaging the cylindrical surface, said valve means being operable by the valve actuator between a closed positon in which the first and second inlets are both closed by the obturating means and an open position in which the relative degree of opening of the first and second inlets are controlled by the rotative position of the mixture control element.

2. A fluid mixing valve, as in claim 1, in which the valve actuator comprises a valve spindle rotatively and axially secured to the mixture control element and positioned coaxially of the cylindrical chamber surface.

3. A fluid mixing valve, as in claim 2, in which a bearing device interconnects the valve closure element and the mixture control element whereby the valve closure element is constrained to move axially with the valve spindle and the mixture control element while permitting the valve spindle and the mixture control element to rotate relative to the chamber.

4. A fluid mixing valve, as in claim 3, in which the valve spindle projects axially from the body, said valve further including a sealing device positioned between the body and the valve spindle and surrounding the valve spindle to inhibit fluid leakage between the body and the valve spindle, the valve means defining opposed surfaces which will be subject to the pressure of fluid in the chamber whenever the valve closure element is moved from its said closed position, and the effective areas of the opposed surfaces differing by an amount corresponding to the cross-sectional area of the valve spindle.

5. A fluid mixing valve, as in claim 3, in which the combined frictional drag resisting axial movement of the valve means exceeds the axial force exerted by the fluid on the valve means when moved to said open position.

6. A fluid mixing valve, as in claim 3, in which the valve means defines surfaces which will be subject to the pressure of fluid in the chamber whenever the valve closure element is moved from its said closed position, and these said surfaces are so positioned that the fluid in the chamber will not produce any resultant axial force on the valve means irrespective of the positions of the valve closing element and the mixture control element within the chamber.

7. A fluid mixing valve, as in claim 3, further comprising a pair of axially spaced sealing rings supported one by the valve closure element and the other by the mixture control element, said sealing rings being positioned axially of the chamber such that said inlets will be positioned between the sealing rings in all operative positions of the valve means whereby the fluid in the chamber will not produce any resultant axial force on the valve means irrespective of the positions of the valve closing element and the mixture control element within the chamber.

8. A fluid mixing valve, as in claim 1, further comprising a valve seat positioned axially between the fluid outlet and the mixture control element, a valve member positioned within the chamber and axially secured to the valve means for joint axial movement within the chamber between a first position in which the valve member sealingly engages the valve seat to inhibit the flow of fluid from the chamber to the fluid outlet and a second position in which the valve member is axially spaced from the valve and radially spaced from the chamber surface, and the valve member is positioned axially relatively to the valve closure element whereby the valve member will occupy its said first position whenever the valve closure element occupies its said closed position and the valve member will occupy its said first position whenever the valve closure element occupies its said open position.

9. A fluid mixing valve, as in claim 1, in which the valve closure element defines a pair of annular grooves spaced coaxially of the chamber, the valve closure element also defines at least two grooves extending longitudinally of the chamber and interconnecting said pair of annular grooves, the obturating means comprises a pair of annular sealing members located respectively in said longitudinal grooves, said sealing members located respectively in said longitudinal grooves, said sealing members sealingly engage the cylindrical chamber surface, said annular grooves position the annular sealing members on opposite sides of said fluid inlets taken axially of the chamber whenever the valve means is in said closed position, and said longitudinal grooves position the longitudinal sealing members on opposite sides of said fluid inlets taken circumferentially of the chamber.

10. A fluid mixing valve, as in claim 1, in which the obturating means comprises a generally cylindrical sleeve mounted on the valve closure element in fixed axial and angular relationship therewith, the sleeve is split longitudinally to be circumferentially expansible into sealing contact with the cylindrical chamber surface to inhibit leakage from the fluid inlets whenever the valve means is in said closed position, two apertures extend through the cylindrical wall of the sleeve whereby the fluid pressure at the fluid inlets is conveyed to the internal surface of the sleeve whenever the valve means is in said closed position, and a sealing arrangement is positioned operatively between the valve closure element and the internal surface of the sleeve and encloses an area of said internal surface adjacent each aperture whereby the fluid pressure at the fluid inlets acts on the said enclosed areas of the internal sleeve surface to expand the sleeve circumferentially into sealing contact with the cylindrical chamber surface.

11. A fluid mixing valve comprising a body defining a chamber having a surface of which at least a portion is cylindrical, said cylindrical surface having a first fluid inlet therein and a second fluid inlet therein at a position spaced from said first fluid inlet, a fluid outlet leading from said chamber, valve means positioned operatively within said chamber and comprising a valve closure element disposed at one axial side of a mixture control element, means for inhibiting rotational movement of the valve closure element within the chamber, obturating means carried by the valve closure element and operatively engaging the cylindrical surface in alignment with the first and second inlets axially of the chamber, a single valve actuator operatively connected to said elements, said elements being supported for simultaneous axial movement in said chamber under the control of the single valve actuator from a closed position in which the first and second inlets are both closed by the obturating means through various axial positions in which the first and second inlets are progressively uncovered by the obturating means whereby the rate at which fluid can flow from the inlets to the outlet will be controlled, the mixture control element being additionally supported for rotational movement relative to both the chamber and the valve closure element under the control of the valve actuator, and fluid flow control surfaces defined by the mixture control element for cooperation with the portions of the inlets uncovered by the valve closure element whereby the rotative position of the mixture control element relative to the body will determine the relative proportions of fluid flowing from the first inlet and the second inlet.

12. A fluid mixing valve, as in claim 11, in which the valve closure element defines two recesses positioned in axial alignment with the first and second inlets respectively, the obturating means comprising two sealing rings located one in each of the said recesses with their axes directed radially of the cylindrical chamber surface, and the sealing rings peripherally engaging the cylindrical chamber surface sealingly to surround the respective fluid inlets when the valve closure member is in the said closed position.

13. A fluid mixing valve, as in claim 12, in which each sealing ring comprises an "O" ring.

14. A fluid mixing valve, as in claim 12, in which each recess defines a radially inner surface, and the radial distance between the radially inner surface of each recess and the corresponding cylindrical chamber surface is less than the axial thickness of the associated sealing ring whereby the sealing rings are axially compressed between the valve closure element and the cylindrical chamber surface.

15. A fluid mixing valve, as in claim 12, in which each sealing ring comprises a tubular member.

16. A fluid mixing valve, as in claim 12, in which each recess defines a radially inner surface, each tubular member defines a radially outer end surface and a radially inner end surface, and the radially outer end surface of each tubular member bears against the corresponding cylindrical chamber surface whereby fluid pressure from the corresponding inlet port will be conveyed through the tubular member to react between the radially inner surface of the recess and the radially inner surface of the tubular member to bias the radially outer surface of the tubular member against the corresponding cylindrical chamber surface.

* * * * *